United States Patent
Seo et al.

(10) Patent No.: US 7,030,424 B2
(45) Date of Patent: Apr. 18, 2006

(54) SUBSTRATE, METHOD OF MANUFACTURING THE SAME AND DISPLAY APPARATUS HAVING THE SAME

(75) Inventors: Bong-Sung Seo, Yongin-si (KR); Duck-Jong Suh, Seoul (KR); Dae-Ho Choo, Yongin-si (KR)

(73) Assignee: Samsung Electronics Co., Ltd., (KR)

( * ) Notice: Subject to any disclaimer, the term of this patent is extended or adjusted under 35 U.S.C. 154(b) by 0 days.

(21) Appl. No.: 10/956,056

(22) Filed: Oct. 4, 2004

(65) Prior Publication Data
US 2005/0224802 A1   Oct. 13, 2005

(30) Foreign Application Priority Data
Apr. 9, 2004   (KR) .................... 10-2004-0024535

(51) Int. Cl.
*H01L 29/22* (2006.01)
(52) U.S. Cl. ............................ 257/98; 257/59; 257/72; 349/96; 349/194
(58) Field of Classification Search ................ 257/59, 257/72, 98; 349/194, 96; 428/131; 313/112
See application file for complete search history.

(56) References Cited

U.S. PATENT DOCUMENTS

| 6,049,428 | A | * | 4/2000 | Khan et al. | ............... | 359/491 |
| 6,747,717 | B1 | * | 6/2004 | Moon | ..................... | 349/97 |
| 6,917,399 | B1 | * | 7/2005 | Pokorny et al. | ............... | 349/96 |

* cited by examiner

*Primary Examiner*—Sara Crane
(74) *Attorney, Agent, or Firm*—Cantor Colburn LLP

(57) ABSTRACT

A substrate includes a substrate body, a first thin film pattern, a second thin film pattern and a third thin film pattern. The substrate body includes a first surface and a second surface that is opposite to the first surface. The first, second and third thin film patterns are formed on the first surface of the substrate body. The first, second and third thin film patterns include first, second and third liquid crystal of which first, second and third liquid crystal molecules are arranged in first direction in order to transmit only first, second and third lights having first, second and third wavelength and a specific polarizing axis, respectively. Therefore, parts of a substrate for a display apparatus may be reduced, so that a process of manufacturing the substrate may be simplified.

32 Claims, 17 Drawing Sheets

SUBSTRATE, METHOD OF MANUFACTURING THE SAME AND DISPLAY APPARATUS HAVING THE SAME

CROSS-REFERENCE TO RELATED APPLICATIONS

This application relies for priority upon Korean Patent Application No. 2004-24535 filed on Apr. 9, 2004, the contents of which are herein incorporated by reference in its entirety.

BACKGROUND OF THE INVENTION

1. Field of the Invention

The present invention relates to a substrate, a method of manufacturing the substrate and a display apparatus having the substrate. More particularly, the present invention relates to a substrate capable of reducing thickness, volume and a number of parts, a method of manufacturing the substrate and a display apparatus having the substrate.

2. Description of the Related Art

In general, a display apparatus converts electric signals processed by an information processing device into images.

A liquid crystal display apparatus is widely used as the display apparatus, because the liquid crystal display apparatus has small volume, and light weight. Further, the liquid crystal display apparatus displays high quality images.

A conventional liquid crystal display apparatus includes a first polarizing plate, a second polarizing plate of which polarization axis is substantially perpendicular to a polarization axis of the first polarizing plate, and a liquid crystal layer interposed between the first and second polarizing plates.

The conventional liquid crystal display apparatus displays an image using electrical and optical characteristics of the liquid crystal. An arrangement of liquid crystal molecules of the liquid crystal is adjusted according to the level and direction of the electric fields to change optical transmittance. Therefore, black and white images are displayed.

In order to display a color image, the conventional display apparatus employs color filter. That is, in the conventional display apparatus, a light passes through the first polarizing plate, the liquid crystal, the color filter and the second polarizing plate in sequence.

Therefore, according to the conventional liquid crystal display apparatus, volume, weight and a number of parts of the conventional liquid crystal display apparatus increase. Furthermore, a manufacturing cost also increases as the parts increases.

SUMMARY OF THE INVENTION

The present invention provides a substrate capable of reducing thickness, volume and a number of parts.

The present invention also provides a method of manufacturing the substrate.

The present invention still provides a display apparatus having the substrate.

In an exemplary substrate according to the invention, the substrate includes a substrate body, a first thin film pattern, a second thin film pattern and a third thin film pattern. The substrate body includes a first surface and a second surface that is opposite to the first surface. The first thin film pattern is formed on the first surface of the substrate body. The first thin film pattern includes a first liquid crystal of which first liquid crystal molecules are arranged in a first direction in order to transmit only a first light having a first wavelength and a specific polarizing axis. The second thin film pattern is formed on the first surface of the substrate body. The second thin film pattern includes a second liquid crystal of which second liquid crystal molecules are arranged in the first direction in order to transmit only a second light having a second wavelength and the specific polarizing axis. The third thin film pattern is formed on the first surface of the substrate body. The third thin film pattern includes a third liquid crystal of which third liquid crystal molecules are arranged in the first direction in order to transmit only a third light having a second wavelength and the specific polarizing axis.

In an exemplary method of manufacturing the substrate according to the invention, a first thin film pattern is formed on a first surface of a substrate body. The first thin film pattern includes a first liquid crystal of which first liquid crystal molecules are arranged in a first direction in order to transmit only a first light having a first wavelength and a specific polarizing axis. A second thin film pattern is formed on the first surface of the substrate body. The second thin film pattern includes second liquid crystal of which second liquid crystal molecules are arranged in the first direction in order to transmit only a second light having a second wavelength and the specific polarizing axis. Then, a third thin film pattern is formed on the first surface of the substrate body. The third thin film pattern includes a third liquid crystal of which third liquid crystal molecules are arranged in the first direction in order to transmit only a third light having a third wavelength and the specific polarizing axis.

In an exemplary display apparatus according to the invention, the display apparatus includes a first substrate, a second substrate, a polarization-color filter pattern, an electric field generating part, a liquid crystal layer and a polarizing plate. The first substrate includes a first surface and a second surface that is opposite to the first surface. The second substrate includes a third surface facing the first surface, and a fourth surface that is opposite to the third surface. The polarization-color filter pattern includes first, second and third thin film patterns. The first thin film pattern is formed on the first surface of the first substrate. The first thin film pattern includes first liquid crystal of which first liquid crystal molecules are arranged in a first direction in order to transmit only a first light having a first wavelength and a first polarizing axis. The second thin film pattern is formed on the first surface of the first substrate. The second thin film pattern includes second liquid crystal of which second liquid crystal molecules are arranged in the first direction in order to transmit only a second light having a second wavelength and the first polarizing axis. The third thin film pattern is formed on the first surface of the first substrate. The third thin film pattern includes a third liquid crystal of which third liquid crystal molecules are arranged in the first direction in order to transmit only a third light having a third wavelength and the first polarizing axis. The electric field generating part is disposed between the first and second substrates. The electric field generating part generates electric fields between the first and second substrates. The liquid crystal layer is disposed between the first and second substrates, and an arrangement of liquid crystal molecules of the liquid crystal layer being changed by the electric fields to adjust an optical transmittance. The polarizing plate is disposed on the second substrate. The polarizing plate has a second polarizing axis.

Therefore, a number of the parts of a substrate for a display apparatus may be reduced, so that a process of manufacturing the substrate may be simplified.

BRIEF DESCRIPTION OF THE DRAWINGS

The above and other features and advantages of the present invention will become more apparent by describing in detailed exemplary embodiments thereof with reference to the accompanying drawings, in which.

DESCRIPTION OF EMBODIMENTS

Hereinafter, the embodiments of the present invention will be described in detail with reference to the accompanied drawings.

Substrate for a Display Apparatus

Embodiment 1

Figure 1:
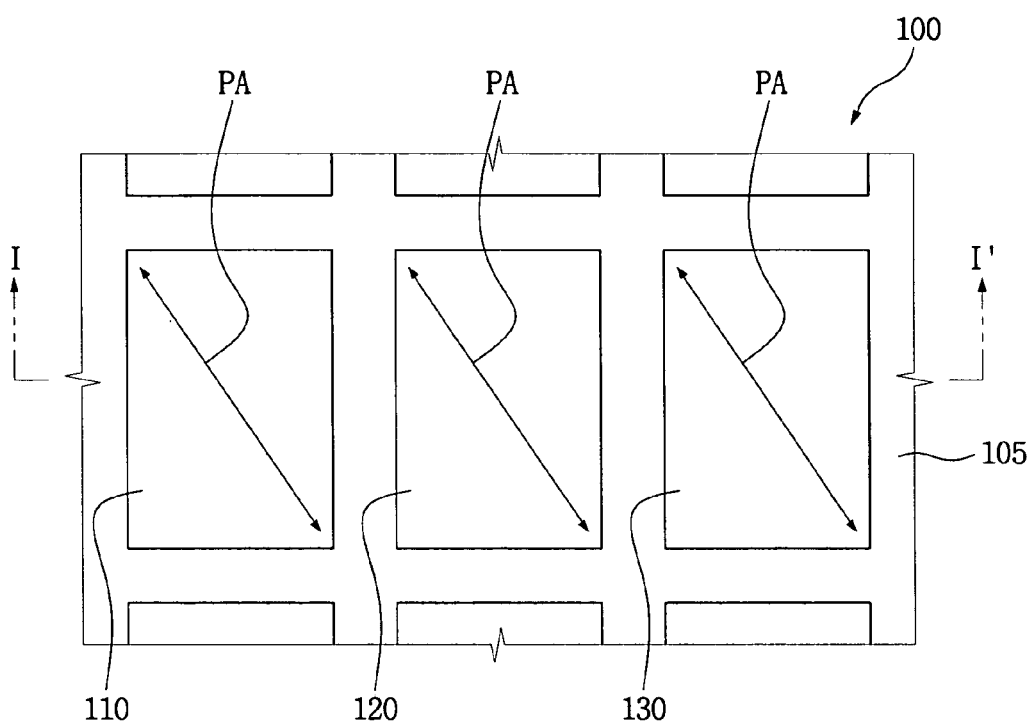
FIG. 1 is a plan view illustrating a portion of a substrate according to a first exemplary embodiment of the present invention.
Figure 2:
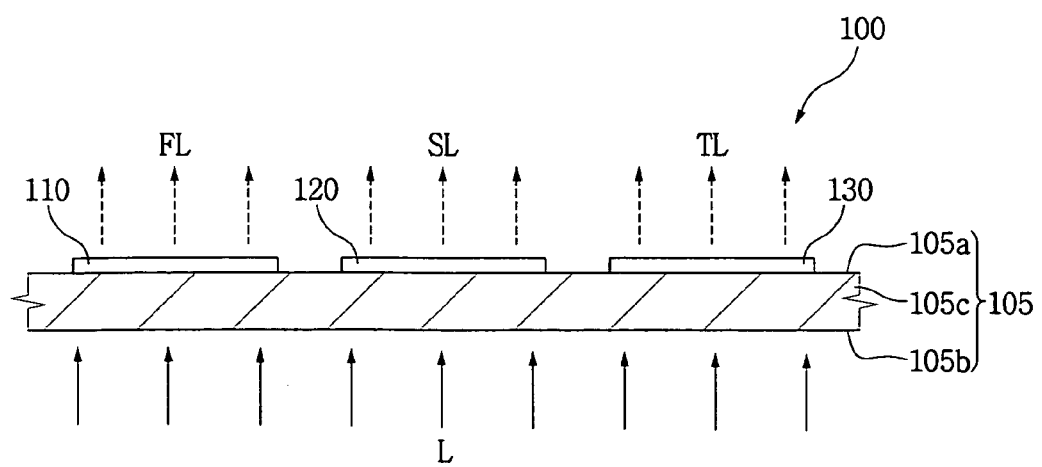
FIG. 2 is a cross-sectional view taken along a line I–I' in FIG. 1.

FIG. 1 is a plan view illustrating a portion of a substrate according to a first exemplary embodiment of the present invention, and FIG. 2 is a cross-sectional view taken along a line I–I' in FIG. 1.

Referring to FIGS. 1 and 2, a substrate 100 for a display apparatus includes first, second and third thin film patterns 110, 120 and 130 formed on a substrate body 105.

The first substrate body 105 includes an optically transparent material, for example, such as glass. The substrate body 105 includes a first surface 105a, a second surface 105b that is opposite to the first surface 105a, and at least three side faces 105c.

The first thin film pattern 110 is disposed on the first surface 105a of the substrate body 105. Preferably, a plurality of first thin film patterns 110 may be arranged in a matrix shape on the first surface 105a.

The first thin film pattern 110 includes first liquid crystal. The first liquid crystal transmits light L that enters the substrate body 105 through the second surface 105b and exits the substrate body 105 through the first surface 105a, selectively. Therefore, only a first light FL having a first wavelength passes through the first liquid crystal.

The first liquid crystal is shown as following formula 1 and formula 2. The first liquid crystal is disclosed in U.S. Pat. Nos. 5,793,296 and 6,049,428.

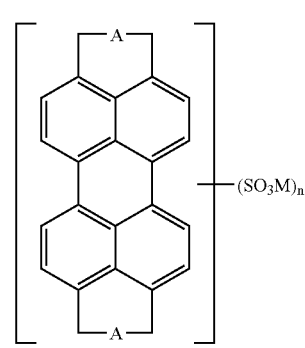

<Formula 1>

-continued

A = —CON(Ar)CO—
R = 4-CH₃O—
R = H
R = 3-CH₃—

<Formula 2>

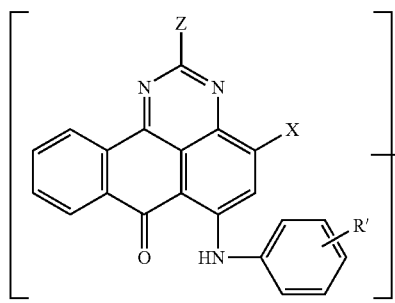

XI ⟨?⟩

R = Ph,
R' = NHPH,
X = Br,

⟨?⟩ indicates text missing or illegible when filed

The first light FL has a wavelength ranged from about 600 nm to about 700 nm, which corresponding to a red color. That is, the first light FL corresponds to a red light.

Molecules of the first liquid crystal of the first thin film pattern 110 are arranged in a specific direction. In order to arrange the molecules of the first liquid crystal, force is applied to the first thin film pattern 110, so that the molecules of the first liquid crystal are arranged toward the polarization axis PA. Therefore, a portion of the first light FL, which has polarizing axis PA, passes through the first liquid crystal. The first polarizing axis may turn towards at any direction.

The second thin film pattern 120 is disposed on the first surface 105a of the substrate body 105. Preferably, a plurality of second thin film pattern 120 is arranged in a matrix shape. The second thin film pattern 120 is disposed between the first thin film patterns 110.

The second thin film pattern 120 includes a second liquid crystal. The second liquid crystal transmits a light L that enters the substrate body 105 through the second surface 105b and exits the substrate body 105 through the first surface 105a, selectively. Therefore, only a second light SL having a second wavelength passes through the second liquid crystal.

The second liquid crystal is shown as following formula 3 and formula 4. The second liquid crystal is disclosed in U.S. Pat. Nos. 5,793,296 and 6,049,428.

-continued

R = OCH₃
n = 2

<Formula 4>

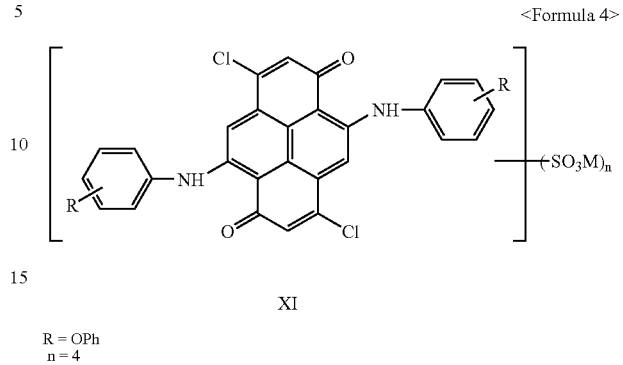

XI

R = OPh
n = 4

The second light SL has a wavelength ranged from about 500 nm to about 600 nm, which corresponding to a green color. That is, the second light SL corresponds to a green light.

Molecules of the second liquid crystal of the second thin film pattern 120 are arranged in a specific direction. In order to arrange the molecules of the second liquid crystal, force is applied to the second thin film pattern 120, so that the molecules of the second liquid crystal are arranged toward the polarization axis PA. Therefore, a portion of the second light SL, which has polarizing axis PA, passes through the second liquid crystal.

The third thin film pattern 130 is disposed on the first surface 105a of the substrate body 105. Preferably, a plurality of third thin film pattern 130 is arranged in a matrix shape. The third thin film pattern 130 is disposed between the first thin film pattern 110 and the second thin film pattern 120.

The third thin film pattern 130 includes third liquid crystal. The third liquid crystal transmits light L that enters the substrate body 105 through the second surface 105b and exits the substrate body 105 through the first surface 105a, selectively. Therefore, only a third light TL having a third wavelength passes through the third liquid crystal.

The third liquid crystal is shown as following formula 5 and formula 6. The third liquid crystal is disclosed in U.S. Pat. Nos. 5,793,296 and 6,049,428.

<Formula 3>

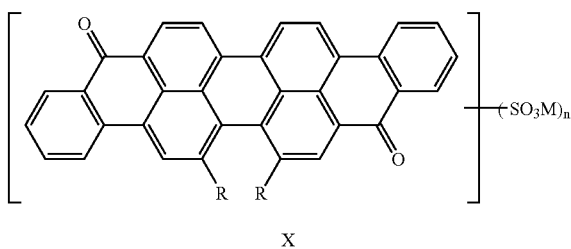

X

<Formula 5>

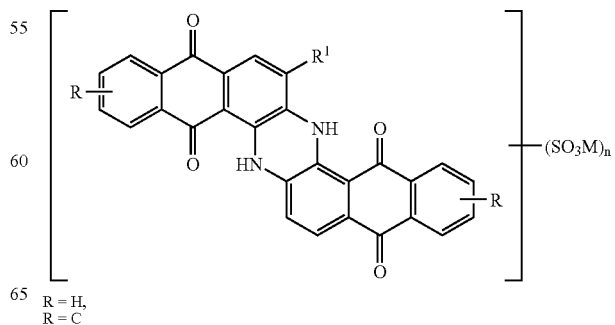

R = H,
R = C

-continued

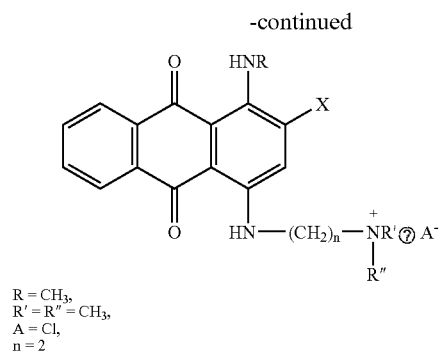

<Formula 6>

R = CH₃,
R' = R'' = CH₃,
A = Cl,
n = 2

⑦ indicates text missing or illegible when filed

The third light TL has a wavelength ranged from about 400 nm to about 500 nm, which corresponding to a blue color. That is, the third light TL corresponds to a blue light.

Molecules of the third liquid crystal of the third thin film pattern 130 are arranged in a specific direction. In order to arrange the molecules of the third liquid crystal, force is applied to the third thin film pattern 130, so that the molecules of the third liquid crystal are arranged toward the polarization axis PA. Therefore, a portion of the third light TL, which has polarizing axis PA, passes through the third liquid crystal.

The substrate 100 including the first, second and third thin film patterns 110, 120 and 130 may be used for a color filter substrate of a liquid crystal display apparatus, a thin film transistor substrate of the liquid crystal display apparatus, a lighting device for an advertisement and decoration, other display apparatus, etc.

Embodiment 2

Figure 3:
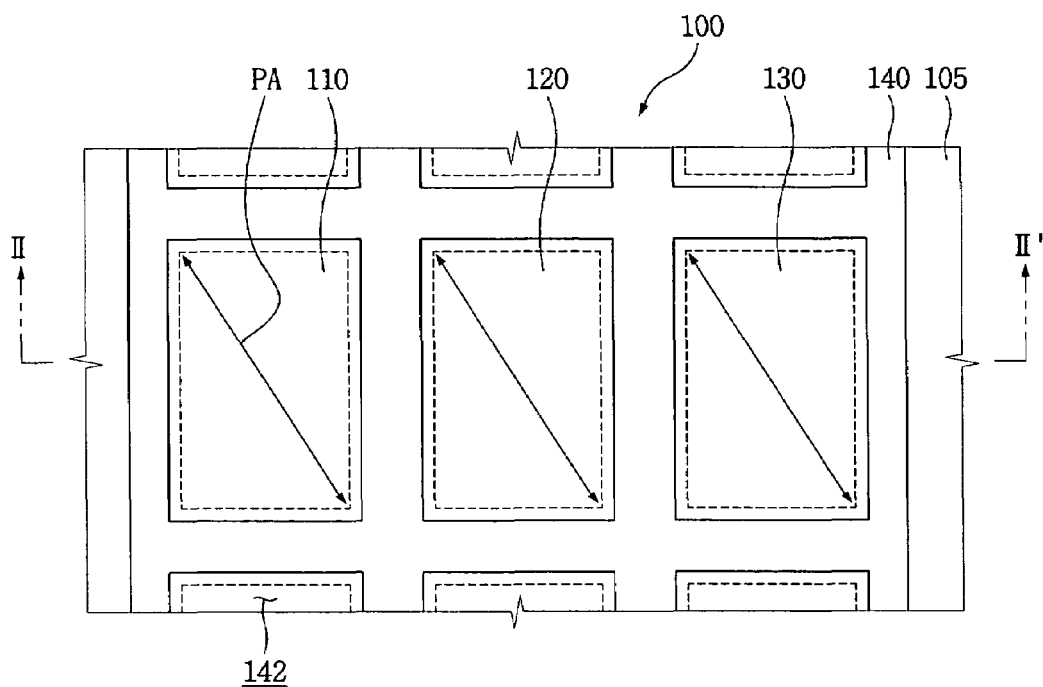
FIG. 3 is a plan view illustrating a portion of a substrate according to a second exemplary embodiment of the present invention.
Figure 4:
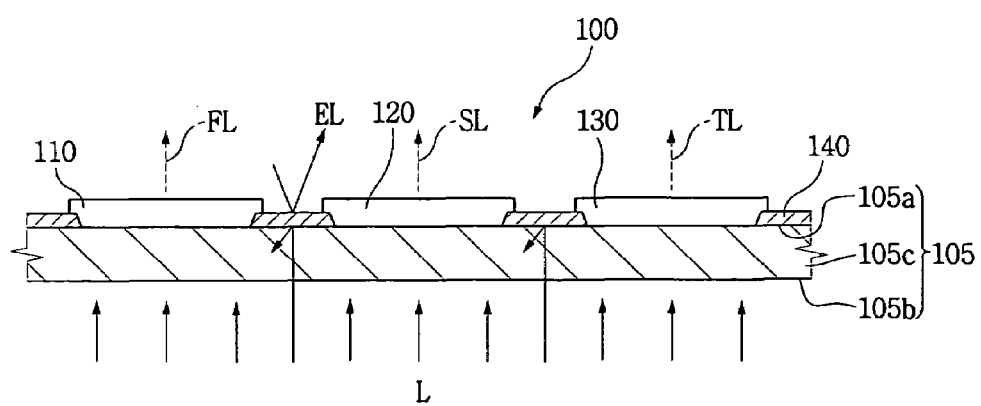
FIG. 4 is a cross-sectional view taken along a line II–II' in FIG. 3.

FIG. 3 is a plan view illustrating a portion of a substrate according to a second exemplary embodiment of the present invention, and FIG. 4 is a cross-sectional view taken along a line II–II' in FIG. 3. The substrate of the present embodiment is the same as in Embodiment 1 except for a black matrix. Thus, the same reference numerals will be used to refer to the same or similar parts as those described in Embodiment 1 and any further explanation will be omitted.

Referring to FIGS. 3 and 4, a black matrix pattern 140 is formed on a first surface 105a of the substrate body 105. A chromium (Cr) thin film, a chromium oxide ($Cr_xO_y$) thin film, a black organic thin film, etc. may be patterned to form the black matrix pattern 140.

The black matrix pattern 140 has a lattice shape. That is, the black matrix pattern 140 includes openings 142. First, second and third thin film pattern 110, 120 and 130 are formed on the first surface 105a, such that the first, second and third thin film patterns 110, 120 and 130 correspond to the openings 142.

The black matrix 140 covers a portion between the first, second and third thin film patterns 110, 120 and 130 to block a light L. Therefore, the light L can only pass through the first, second and third thin film patterns 110, 120 and 130.

Additionally, the black matrix pattern 140 prevents an external light EL that advances toward the first surface 105a from being reflected.

According to the present embodiment, the first, second and third thin film patterns 110, 120 and 130 filter the light L to generate a first light FL that corresponds to a red light, a second light SL that corresponds to a green light, and a third light TL that corresponds to a blue light. Furthermore, the black matrix pattern 140 enhances visibilities of the first, second and third lights FL, SL and TL.

The substrate 100 including the first, second and third thin film patterns 110, 120 and 130, and the black matrix pattern 140 may be used for a color filter substrate of a liquid crystal display apparatus.

Embodiment 3

Figure 5:
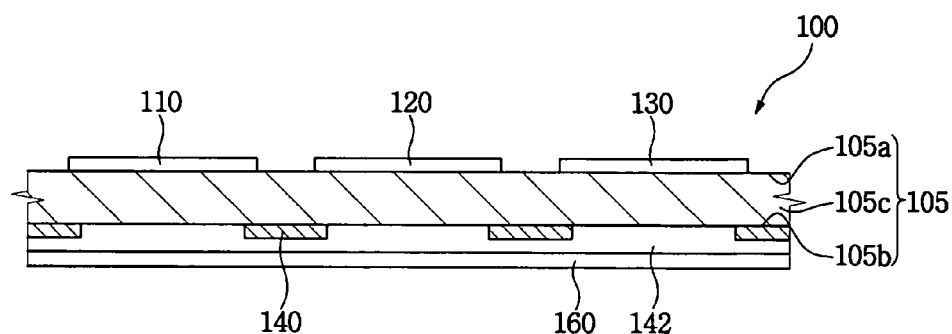
FIG. 5 is a cross-sectional view illustrating a substrate according to a third exemplary embodiment of the present invention.

FIG. 5 is a cross-sectional view illustrating a substrate according to a third exemplary embodiment of the present invention. The substrate of the present embodiment is the same as in Embodiment 2 except for a position of a black matrix pattern. Thus, the same reference numerals will be used to refer to the same or similar parts as those described in Embodiment 2 and any further explanation will be omitted.

Referring to FIG. 5, first, second and third thin film patterns 110, 120 and 130 are formed on a first surface 105a of the substrate body 105, and a black matrix pattern 140 is formed on a second surface 105b that is opposite to the first surface 105a.

A leveling layer 142 that is optically transparent is formed on the second surface 105b having the black matrix pattern 140 formed thereon.

A transparent electrode 160 that is electrically conductive is formed on the leveling layer 142. For example, the transparent electrode 160 includes indium tin oxide (ITO), indium zinc oxide (IZO), etc.

The substrate 100 of the present embodiment may be used for a color filter substrate of a liquid crystal display apparatus. The substrate 100 may be assembled with a thin film transistor substrate, such that the second surface 105b having the black matrix pattern 140 and the transparent electrode 160 formed thereon faces the thin film transistor substrate.

Embodiment 4

Figure 6:
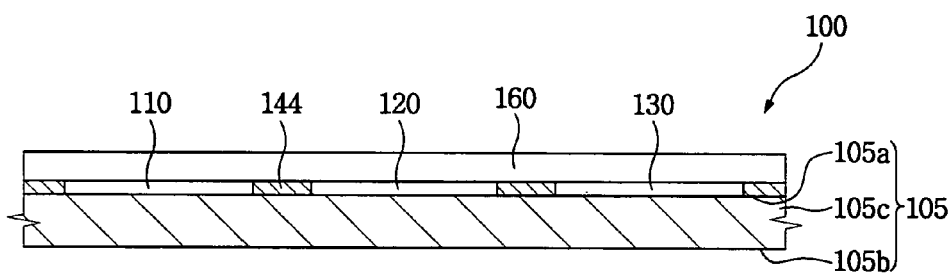
FIG. 6 is a cross-sectional view illustrating a substrate according to a fourth exemplary embodiment of the present invention.

FIG. 6 is a cross-sectional view illustrating a substrate according to a fourth exemplary embodiment of the present invention. The substrate of the present embodiment is the same as in Embodiment 1 except for a black matrix pattern, a leveling layer and a transparent electrode. Thus, the same reference numerals will be used to refer to the same or similar parts as those described in Embodiment 1 and any further explanation will be omitted.

Referring to FIG. 6, a first thin film pattern 110, a second thin film pattern 120, a third thin film pattern 130 are arranged in a matrix shape on a first surface 105a of a substrate 100 for a display apparatus.

A black matrix pattern 144 having a lattice shape is formed on the first surface 105a. The first, second and third thin film patterns 110, 120 and 130 are disposed in openings of the black matrix pattern 144. A chromium thin film and a chromium oxide may be patterned to form the black matrix pattern 144. A black organic thin film may be patterned to form the black matrix pattern 144.

According to the present embodiment, a thickness of the black matrix pattern 144 is substantially the same as a thickness of the first, second and third thin film patterns 110, 120 and 130. Therefore, the black matrix pattern 144, and first to third thin film patterns 110, 120 and 130 form a flat surface.

A transparent electrode 160 is formed on the black matrix pattern 144, and the first, second and third thin film patterns 110, 120 and 130. The transparent electrode 160 includes an optically transparent and electrically conductive material, for example, such as indium tin oxide (ITO), indium zinc oxide (IZO), etc.

A leveling layer (not shown) may be interposed between the first to third thin film patterns 110, 120 and 130, and the black matrix pattern 144.

Embodiment 5

Figure 7:
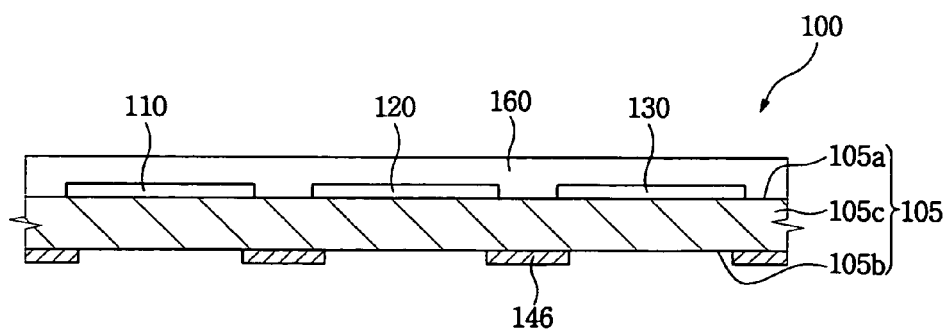
FIG. 7 is a cross-sectional view illustrating a substrate according to a fifth exemplary embodiment of the present invention.

FIG. 7 is a cross-sectional view illustrating a substrate according to a fifth exemplary embodiment of the present invention. The substrate of the present embodiment is the same as in Embodiment 1 except for a black matrix pattern and a transparent electrode. Thus, the same reference numerals will be used to refer to the same or similar parts as those described in Embodiment 1 and any further explanation will be omitted.

Referring to FIG. 7, a transparent electrode 160 is formed on a first surface 105a having first, second and third thin film patterns 110, 120 and 130 formed thereon. The transparent electrode 160 includes an optically transparent and electrically conductive material, for example, such as indium tin oxide (ITO), indium zinc oxide (IZO), etc. In order to prevent leakage of light, a black matrix pattern 146 is formed on a second surface 105b of a substrate body 105.

Embodiment 6

Figure 8:
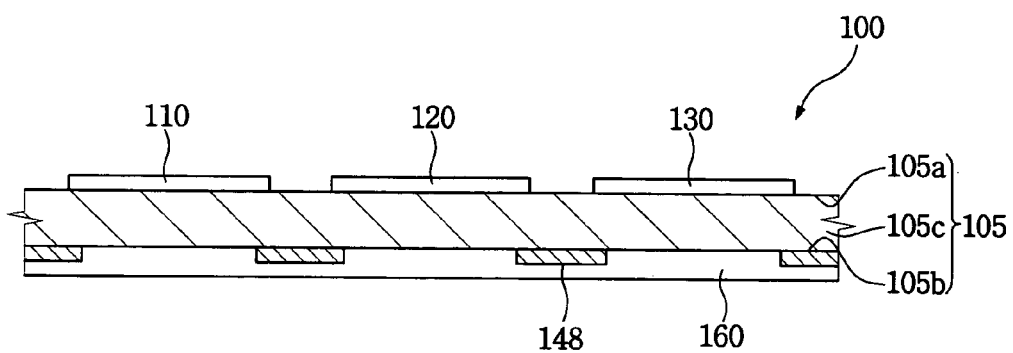
FIG. 8 is a cross-sectional view illustrating a substrate according to a sixth exemplary embodiment of the present invention.

FIG. 8 is a cross-sectional view illustrating a substrate according to a sixth exemplary embodiment of the present invention. The substrate of the present embodiment is the same as in Embodiment 1 except for a black matrix pattern and a transparent electrode. Thus, the same reference numerals will be used to refer to the same or similar parts as those described in Embodiment 1 and any further explanation will be omitted.

Referring to FIG. 8, a black matrix pattern 148 is formed on a second surface 105b of a substrate body 105. A transparent electrode 160 is formed on the second surface 105b having the black matrix pattern 148 formed thereon. The black matrix pattern 148 has a lattice shape having a plurality of openings.

First, second and third thin film patterns 110, 120 and 130 are formed on a first surface 105a that is opposite to the second surface 105b, such that the first, second and third thin film patterns 110, 120 and 130 correspond to the openings, respectively.

Embodiment 7

Figure 9:
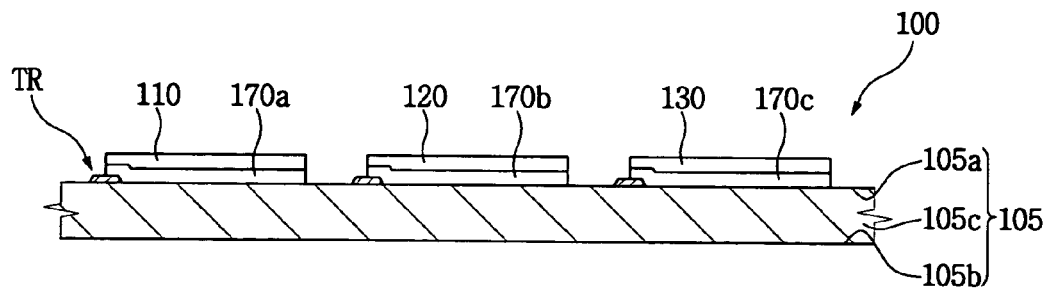
FIG. 9 is a cross-sectional view illustrating a substrate according to a seventh exemplary embodiment of the present invention.
Figure 10:
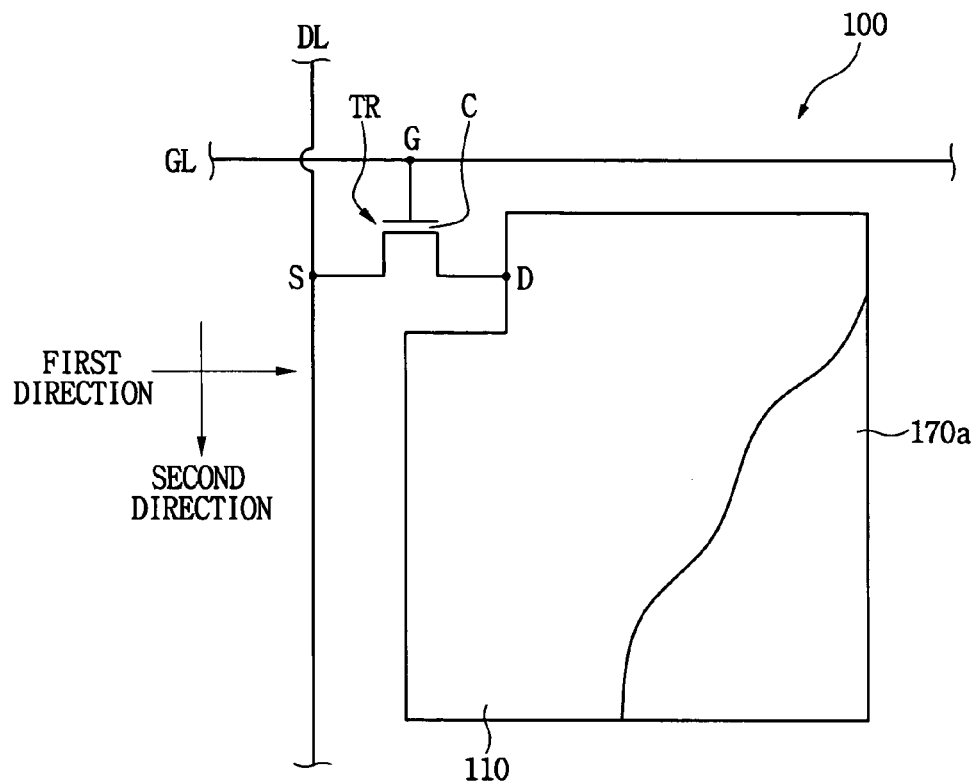
FIG. 10 is a conceptual view illustrating a pixel electrode and a thin film transistor in FIG. 9.

FIG. 9 is a cross-sectional view illustrating a substrate according to a seventh exemplary embodiment of the present invention, and FIG. 10 is a conceptual view illustrating a pixel electrode and a thin film transistor in FIG. 9. The substrate of the present embodiment is the same as in Embodiment 1 except for a structure of an electrode and a thin film transistor. Thus, the same reference numerals will be used to refer to the same or similar parts as those described in Embodiment 1 and any further explanation will be omitted.

Referring to FIGS. 9 and 10, first, second and third electrodes 170a, 170b and 170c are formed on a first surface 105a of a substrate body 105. The first, second and third electrodes 170a, 170b and 170c includes an optically transparent and electrically conductive material, for example, such as indium tin oxide (ITO), indium zinc oxide (IZO), etc.

Each of the first, second and third electrodes 170a, 170b and 170c is electrically connected to a thin film transistor TR. The thin film transistor TR includes a gate electrode G, a source electrode S, a channel layer C and a drain electrode D.

The gate electrode G is divided out in a second direction from a gate line GL extended in a first direction that is substantially perpendicular to the second direction.

The channel layer C is formed over the gate electrode G. An insulation layer (not shown) is interposed between the channel layer C and the gate electrode G, so that the channel layer C is electrically insulated from the gate electrode G. The channel layer C may include an amorphous silicon pattern and n+ amorphous silicon pattern. The amorphous silicon pattern is formed on the insulation layer, and a pair of the n+ amorphous silicon pattern is formed apart on the amorphous silicon pattern, such that the pair of the n+ amorphous silicon pattern is electrically insulated from each other.

The source electrode S is divided out in the first direction from a data line DL extended in the second direction. The source electrode S is electrically connected to one of the n+ amorphous silicon patterns.

The drain electrode D is extended in the first direction and the drain electrode D is electrically connected to the other n+ amorphous silicon pattern. The drain electrode D is electrically connected to the first electrode 170a, the second electrode 170b or the third electrode 170c.

For example, the first, second and third electrodes 170a, 170b and 170c that are electrically connected to the thin film transistor TR include an optically transparent and electrically conductive material. The first, second and third electrodes 170a, 170b and 170c may include metal.

First, second and third thin film patterns 110, 120 and 130 are formed on the first, second and third electrodes 170a, 170b and 170c, respectively.

The substrate 100 for a display apparatus may be used for a thin film transistor of a liquid crystal display apparatus. The substrate 100 polarizes light that enters the substrate 100 through the second surface 105b, and the substrate 100 filters the light to have a specific wavelength corresponding to red, green or blue color.

Embodiment 8

Figure 11:
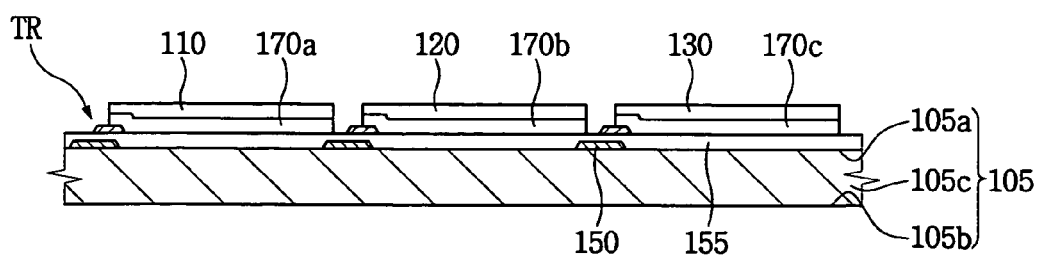
FIG. 11 is a cross-sectional view illustrating a substrate according to an eighth exemplary embodiment of the present invention.

FIG. 11 is a cross-sectional view illustrating a substrate according to an eighth exemplary embodiment of the present invention. The substrate of the present embodiment is the same as in Embodiment 7 except for a black matrix pattern and an insulation layer. Thus, the same reference numerals will be used to refer to the same or similar parts as those described in Embodiment 7 and any further explanation will be omitted.

Referring to FIG. 11, a black matrix pattern 150 is formed on a first surface 105a of a substrate body 105. The black matrix pattern 150 has a lattice shape. The black matrix pattern 150 prevents a light leakage. The black matrix pattern 150 is interposed between first to is third electrodes 170a, 170b and 170c and the first surface 105a of the substrate source body 105. A chromium thin film, a chromium oxide thin film or a black organic thin film may be patterned to form the black matrix pattern 150.

A transparent insulation layer 155 is formed on the first surface 105a having the black matrix pattern 150 formed thereon in order to prevent electrical short between first to third electrodes 170a, 170b and 170c and the black matrix pattern 150.

For example, the black matrix pattern 150 may be formed on the first surface 105a. The first to third thin film patterns 110, 120 and 130 may be formed on the first surface 105a having the black matrix pattern formed thereon. The first to third electrodes 170a, 170b and 170c may be formed on the first to third thin film patterns 110, 120 and 130, respectively.

Method of Manufacturing a Substrate for a Display Apparatus

Embodiment 9

Figure 12:
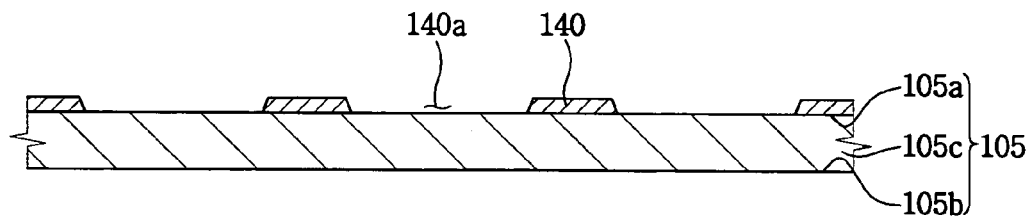
FIG. 12 is a cross-sectional view illustrating a black matrix pattern formed on a substrate according to a ninth exemplary embodiment of the present invention.

FIG. 12 is a cross-sectional view illustrating a black matrix pattern formed on a substrate according to a ninth exemplary embodiment of the present invention.

Referring to FIG. 12, a substrate body 105 has a rectangular plate shape, and the substrate body 105 includes a transparent material having a high optical transmittance. For example, the substrate body 105 may includes glass. The substrate body 105 includes a first surface 105a, a second surface 105b that is opposite to the first surface 105a, and a side surface 105c connecting the first and second surfaces 105a and 105b.

A black matrix pattern 140 is formed on a first surface 105a. The black matrix pattern 140 has a lattice shape. A chromium thin film, a chromium oxide thin film or a black organic thin film may be patterned to form the black matrix pattern 140.

Figure 13:
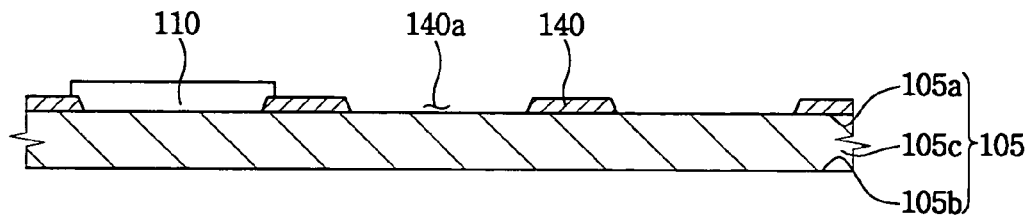
FIG. 13 is a cross-sectional view illustrating a first thin film pattern formed on the substrate having the black matrix pattern in FIG. 12.

FIG. 13 is a cross-sectional view illustrating a first thin film pattern formed on the substrate having the black matrix pattern in FIG. 12.

Referring to FIG. 13, a first thin film pattern 110 is formed on the first surface 105a having the black matrix 140 formed thereon. In detail, the first thin film pattern 110 is formed in an opening 140a of the black matrix pattern 140.

The first thin film pattern 110 includes a first liquid crystal. The first liquid crystal polarizes and filters a light that enters the substrate body 105 through the second surface 105b. Therefore, a first light that is polarized and has a specific range of wavelength exits the first thin film pattern 110. For example, the first light has a wavelength that corresponds to a red color.

Figure 14:
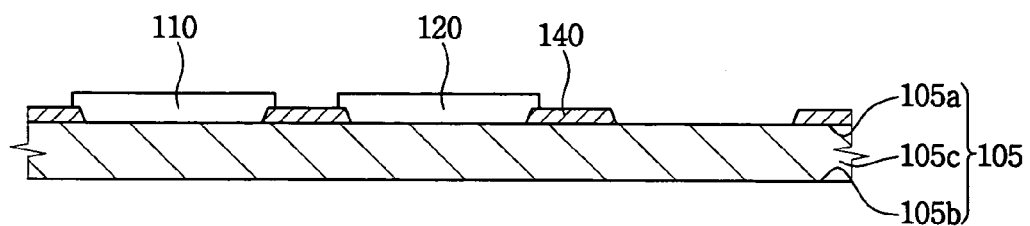
FIG. 14 is a cross-sectional view illustrating a second thin film pattern formed on the substrate having the first thin film pattern in FIG. 13.

FIG. 14 is a cross-sectional view illustrating a second thin film pattern formed on the substrate having the first thin film pattern in FIG. 13.

Referring to FIG. 14, a second thin film pattern 120 is formed on the first surface 105a having the black matrix 140 and the first thin film pattern 110 formed thereon. In detail, the second thin film pattern 120 is formed in an opening 140a of the black matrix pattern 140. The second thin film pattern 120 is adjacent to the first thin film pattern 110.

The second thin film pattern 120 includes a second liquid crystal. The second liquid crystal polarizes and filters a light that enters the substrate body 105 through the second surface 105b. Therefore, a second light that is polarized and has a specific range of wavelength exits the second thin film pattern 120. For example, the second light has a wavelength that corresponds to a green color.

Figure 15:
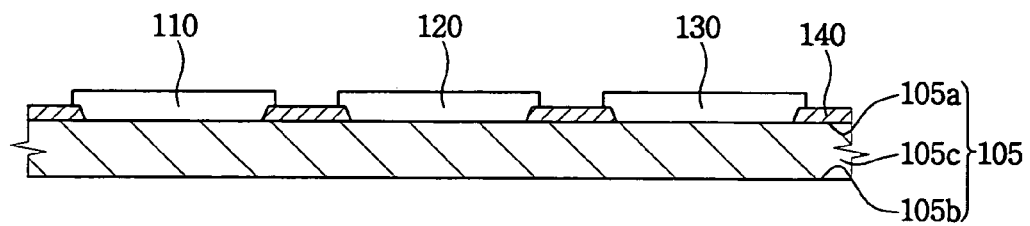
FIG. 15 is a cross-sectional view illustrating a third thin film pattern formed on the substrate having the second thin film pattern in FIG. 14.

FIG. 15 is a cross-sectional view illustrating a third thin film pattern formed on the substrate having the second thin film pattern in FIG. 14.

Referring to FIG. 15, a third thin film pattern 130 is formed on the first surface 105a having the black matrix 140 and the first and second thin film patterns 110 and 120 formed thereon. In detail, the third thin film pattern 130 is formed in an opening 140a of the black matrix pattern 140. The third thin film pattern 130 is adjacent to the second thin film pattern 120.

The third thin film pattern 130 includes a third liquid crystal. The third liquid crystal polarizes and filters a light that enters the substrate body 105 through the second surface 105b. Therefore, a third light that is polarized and has a specific range of wavelength exits the third thin film pattern 120. For example, the third light has a wavelength that corresponds to a blue color.

Hereinafter, a process of manufacturing the first, second and third thin film patterns will be explained.

Embodiment 10

Figure 16:
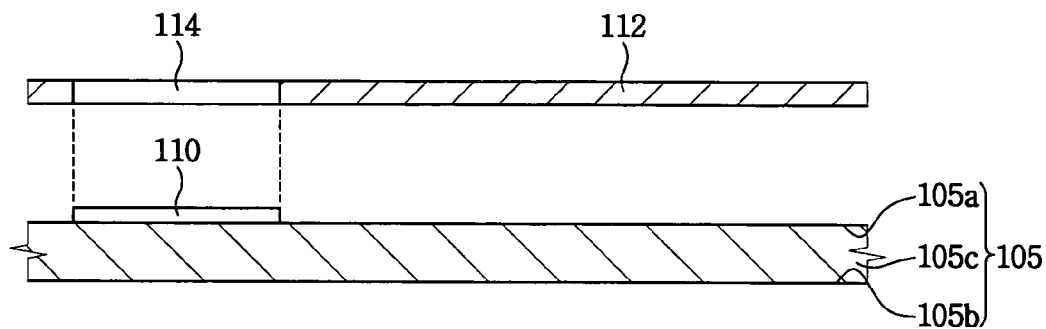
FIGS. 16 to 18 are cross-sectional views illustrating a process of forming first to third thin film patterns according to a tenth exemplary embodiment of the present invention.
Figure 17:
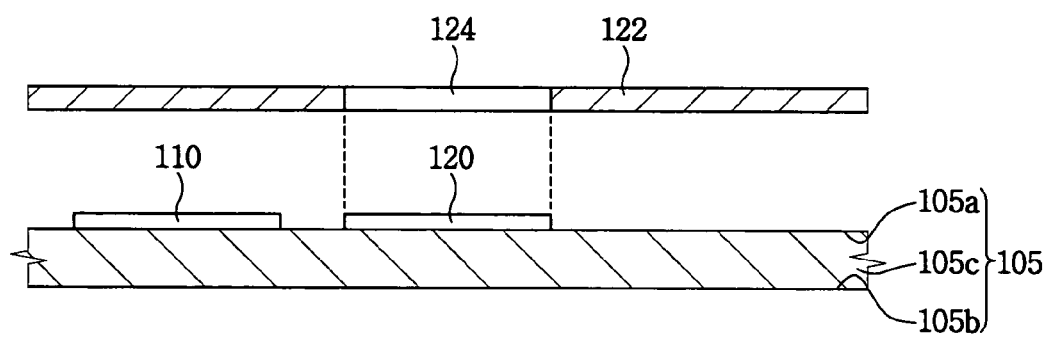
Figure 18:
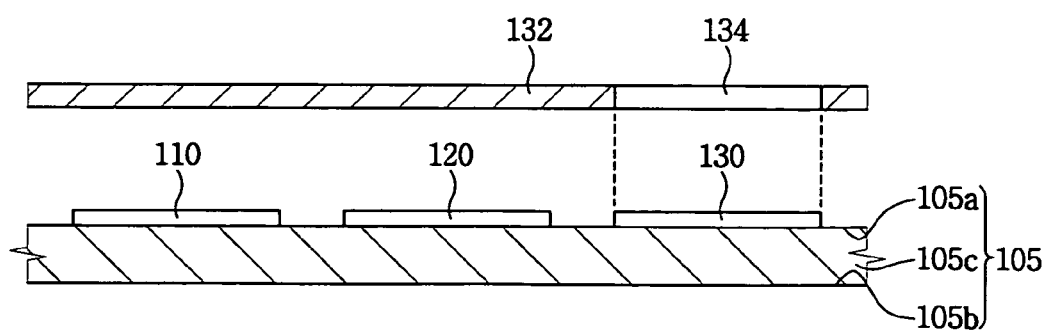

FIGS. 16 to 18 are cross-sectional views illustrating a process of forming first to third thin film patterns according to a tenth exemplary embodiment of the present invention.

Referring to FIG. 16, a first mask 112 is placed to face a first surface 105a of a substrate body 105. The first mask 112 has a first opening 114. The first mask 112 may make contact with the first surface 105a or the first mask 112 may not make contact with the first surface 105a.

When the first mask 112 is placed to face the first surface 105a, a first liquid crystal is applied to the first surface 105a through the first opening 114 by spray method or inkjet method.

The first liquid crystal transmits a light that has a first wavelength corresponding to a red light.

Additionally, the first liquid crystal undergoes a process for polarizing light. That is, the first surface 105a of the substrate body 105 undergoes an alignment process before the first liquid crystal is applied. In order to adjust a polarizing axis, an alignment film may be formed on the first surface 105a, and an alignment portion for aligning the first liquid crystal is formed on the alignment film.

The alignment film may correspond to a polyimide thin film, and the alignment portion may correspond to an alignment groove. The alignment film may correspond to a diamond-like carbon thin film, and the alignment portion may correspond to a chain having polarity, which is formed by accelerated ions or atoms that collides with the diamond-like carbon thin film.

Therefore, the first thin film pattern 110 having the polarizing axis is completed.

Referring to FIG. 17, a second mask 122 is placed to face a first surface 105a of a substrate body 105. The second mask 122 has a second opening 124. The second mask 122 may make contact with the first surface 105a or the second mask 122 may not make contact with the first surface 105a.

When the second mask 122 is placed to face the first surface 105a, a second liquid crystal is applied to the first surface 105a through the second opening 124 by spray method or inkjet method.

The second liquid crystal transmits light that has a second wavelength corresponding to green light.

Additionally, the second liquid crystal undergoes a process for polarizing light. The second thin film pattern 120 has substantially the same direction of polarizing axis of the first thin film pattern 110.

Therefore, the second thin film pattern 120 having the polarizing axis is completed.

Referring to FIG. 18, a third mask 132 is placed to face a first surface 105a of a substrate body 105. The third mask 132 has a third opening 134. The third mask 132 may make contact with the first surface 105a or the third mask 132 may not make contact with the first surface 105a.

When the third mask 132 is set to face the first surface 105a, a third liquid crystal is applied to the first surface 105a through the third opening 134 by spray method or inkjet method.

The third liquid crystal transmits a light that has a third wavelength corresponding to a blue light.

Additionally, the third liquid crystal undergoes a process for polarizing a light. The third thin film pattern 130 has substantially the same direction of polarizing axis of the first and second thin film patterns 110 and 120.

Therefore, the third thin film pattern 130 having the polarizing axis is completed.

Embodiment 11

FIGS. 19 to 24 are cross-sectional views illustrating a process of forming first to third thin film patterns according to an eleventh exemplary embodiment of the present invention.

Figure 19:
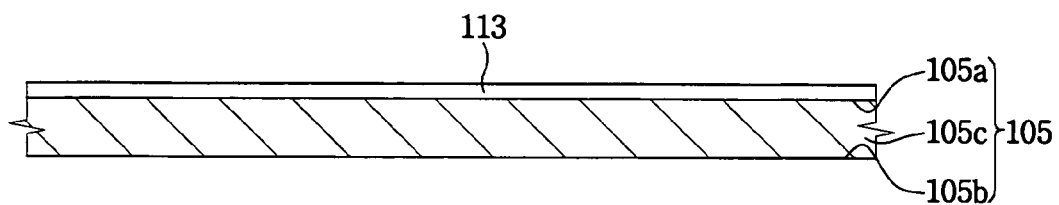
FIGS. 19 to 24 are cross-sectional views illustrating a process of forming first to third thin film patterns according to an eleventh exemplary embodiment of the present invention.

Referring to FIG. 19, a first liquid crystal layer 113 is coated on a first surface 105a of a substrate body 105 by a spin coating method or a slit coating method. The first liquid crystal layer 113 transmits a first light having a first wavelength that corresponds to a red light.

Figure 20:
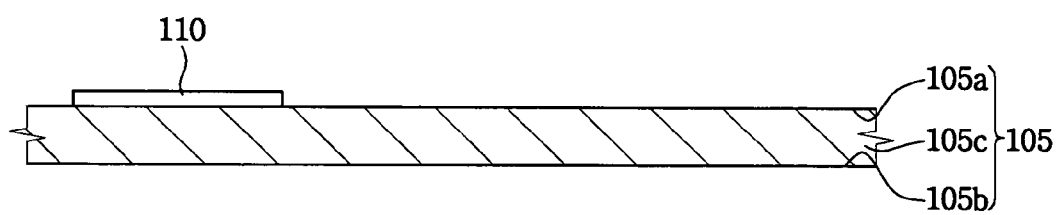

Referring to FIG. 20, the first liquid crystal layer 113 is patterned through a photolithography process to form a first thin film pattern 110.

Figure 21:
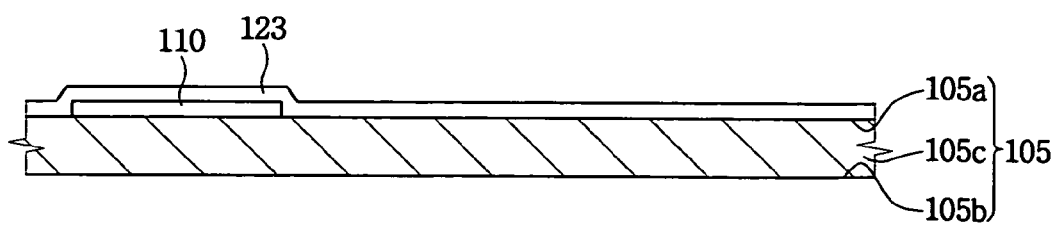

Referring to FIG. 21, a second liquid crystal layer 123 is coated on the first surface 105a having the first thin film pattern 110 by a spin coating method or a slit coating method. The second liquid crystal layer 123 transmits a second light having a second wavelength that corresponds to a green light.

Figure 22:
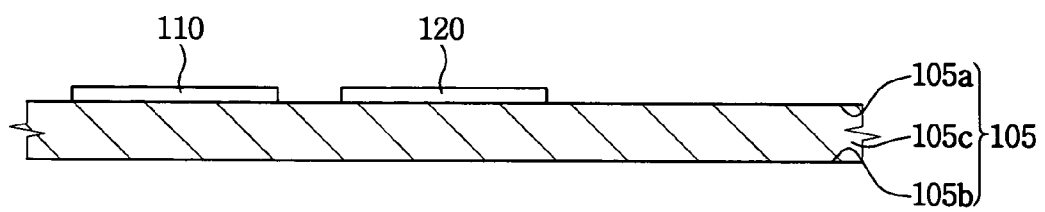

Referring to FIG. 22, the second liquid crystal layer 123 is patterned through a photolithography process to form a second thin film pattern 120.

Figure 23:
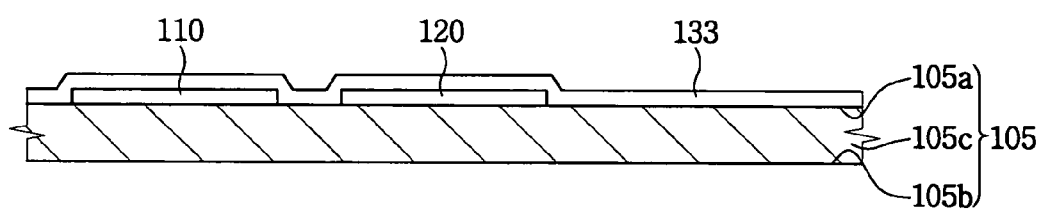

Referring to FIG. 23, a third liquid crystal layer 133 is coated on the first surface 105a having the first and second thin film patterns 110 and 120 by a spin coating method or a slit coating method. The third liquid crystal layer 133 transmits third light having a third wavelength that corresponds to a blue light.

Figure 24:
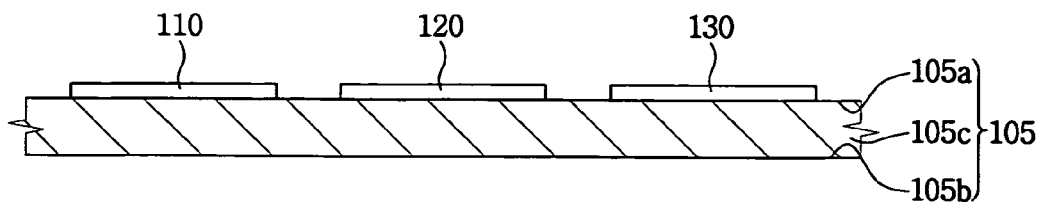

Referring to FIG. 24, the third liquid crystal layer 133 is patterned through a photolithography process to form a third thin film pattern 130.

When the first, second and third thin film patterns 110, 120 and 130 are formed on the first surface 105a of the substrate body 105, liquid crystal molecules of the first, second and third liquid crystal are rearranged along a specific direction. Therefore, the first, second and third thin film patterns 110, 120 and 130 generate red, green and blue lights, respectively, that have the same specific direction of polarizing axis each other.

Embodiment 12

Figure 25:
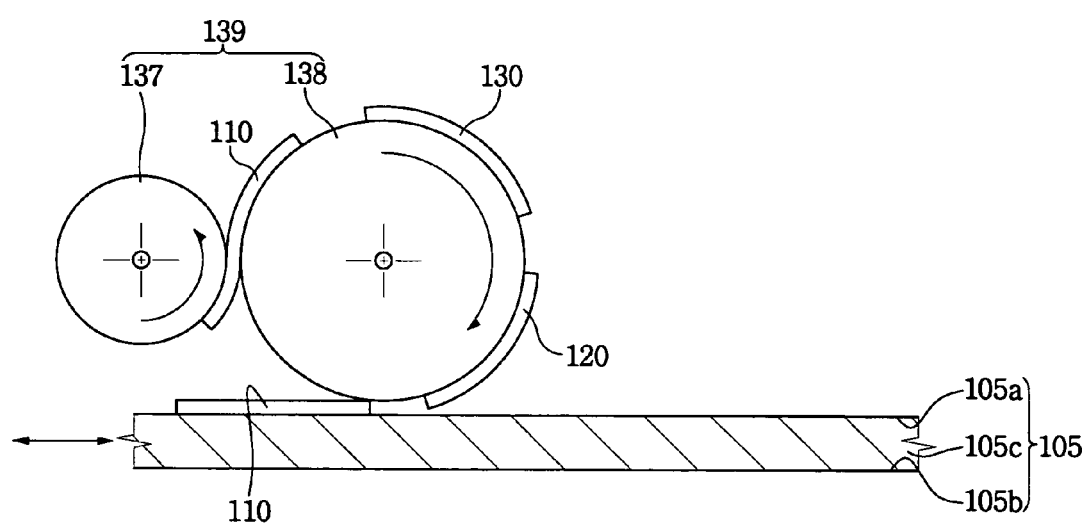
FIG. 25 is a conceptual view illustrating a method of manufacturing a substrate for a display apparatus according to a twelfth exemplary embodiment of the present invention.

FIG. 25 is a conceptual view illustrating a method of manufacturing a substrate for a display apparatus according to a twelfth exemplary embodiment of the present invention.

Referring to FIG. 25, a transcription roller 139 is set over a first surface 105a of a substrate body 105 in order to form first, second and third thin film patterns 110, 120 and 130. The transcription roller 139 includes at least one roller. For example, the transcription roller 139 includes first and second rollers 137 and 138.

The first, second and third thin film patterns 110, 120 and 130 are disposed on the first roller 137, and the first, second and third thin film patterns 110, 120 and 130 are transcribed to the second roller 138.

Then, the first, second and third thin film patterns 110, 120 and 130 are transcribed to the first surface 105a.

When the first, second and third thin film patterns 110, 120 and 130 are transcribed to the first surface 105a, the molecules of first, second and third liquid crystals are rearranged to form a polarization axis.

Embodiment 13

Figure 26:
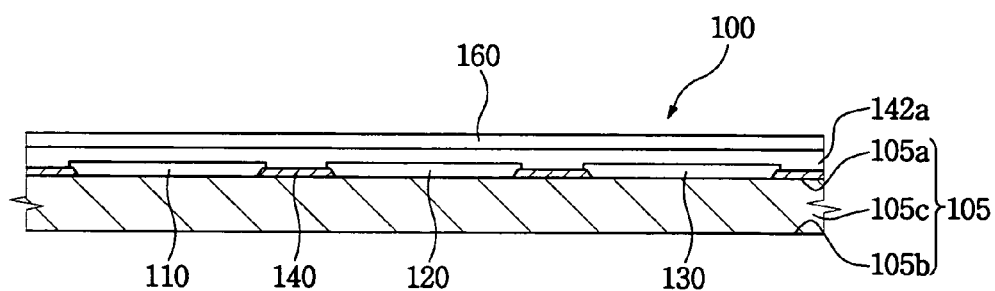
FIG. 26 is a cross-sectional view illustrating a method of manufacturing a substrate for a display apparatus according to a thirteenth exemplary embodiment of the present invention.

FIG. 26 is a cross-sectional view illustrating a method of manufacturing a substrate for a display apparatus according to a thirteenth exemplary embodiment of the present invention. The method of the present embodiment is the same as in Embodiment 9 except for a structure of a leveling layer and a transparent electrode. Thus, the same reference numerals will be used to refer to the same or similar parts as those described in Embodiment 9 and any further explanation will be omitted.

Referring to FIG. 26, a leveling layer 142a is formed, such that the leveling layer 142a covers first, second and third thin film patterns 110, 120 and 130, and a black matrix pattern 140. Then an optically transparent and electrically conductive material, for example, such as indium tin oxide (ITO), indium zinc oxide (IZO), etc. is coated on the leveling layer 142a to form a transparent electrode 160.

The black matrix pattern 140 disposed on the first surface 105a blocks a light that leaks through first and second thin film patterns 110 and 120 or second and third thin film pattern 120 and 130. A chromium thin film, a chromium oxide thin film or a black organic thin film may be patterned to form the black matrix pattern 140.

Embodiment 14

Figure 27:
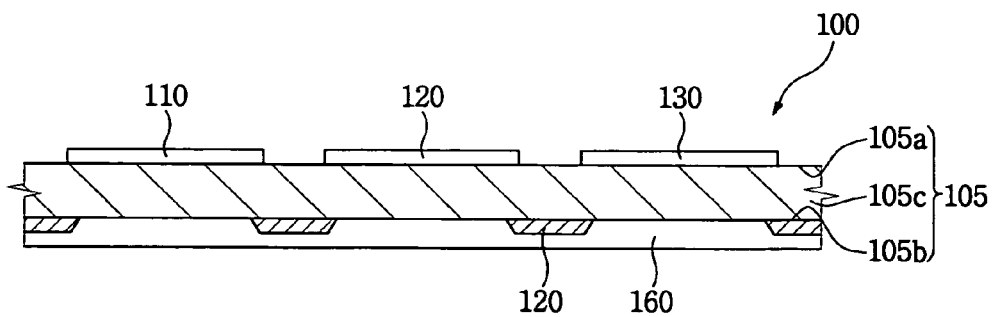
FIG. 27 is a cross-sectional view illustrating a method of manufacturing a substrate for a display apparatus according to a fourteenth exemplary embodiment of the present invention.

FIG. 27 is a cross-sectional view illustrating a method of manufacturing a substrate for a display apparatus according to a fourteenth exemplary embodiment of the present invention. The method of the present embodiment is the same as in Embodiment 13 except for an arrangement of a black matrix pattern and a transparent electrode. Thus, the same reference numerals will be used to refer to the same or similar parts as those described in Embodiment 13 and any further explanation will be omitted.

Referring to FIG. 27, first, second and third thin film patterns 110, 120 and 130 are formed on a first surface 105a, and a black matrix pattern 120 and a transparent electrode 160 are formed on a second surface 105b opposite to the first surface 105a.

For example, the black matrix pattern 142 is formed on the second surface 105b, and the transparent electrode 160 is formed on the second surface 105b having the black matrix pattern 120 formed thereon to cover the black matrix pattern 105b. However, the transparent electrode 160 may be formed on the second surface 105b, and the black matrix pattern 172 may be formed on the transparent electrode 160.

Embodiment 15

Figure 28:
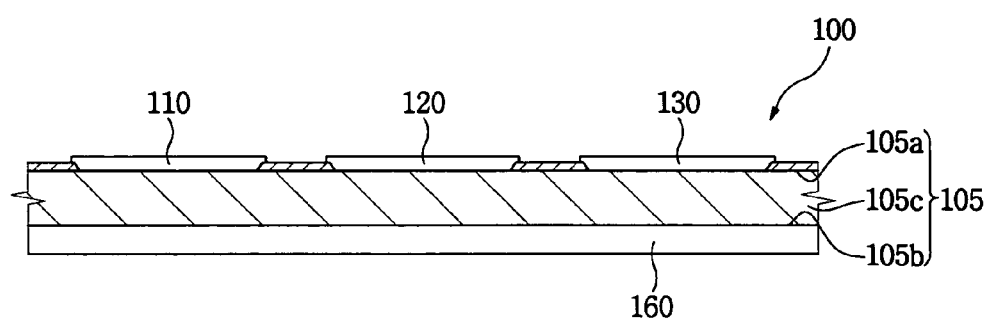
FIG. 28 is a cross-sectional view illustrating a method of manufacturing a substrate for a display apparatus according to a fifteenth exemplary embodiment of the present invention.

FIG. 28 is a cross-sectional view illustrating a method of manufacturing a substrate for a display apparatus according to a fifteenth exemplary embodiment of the present invention. The method of the present embodiment is the same as in Embodiment 13 except for an arrangement of a transparent electrode. Thus, the same reference numerals will be used to refer to the same or similar parts as those described in Embodiment 13 and any further explanation will be omitted.

Referring to FIG. 28, when first, second and third thin film patterns 110, 120 and 130, and a black matrix pattern 140 are formed on a first surface 105a of a substrate body 105, a transparent electrode 160 is formed on a second surface 105b that is opposite to the first surface 105a.

On the contrary, when the transparent electrode 160 is formed on the second surface 105b, the first, second and third thin film patterns 110, 120 and 130, and a black matrix pattern 140 may be formed on a first surface 105a.

Embodiment 16

Figure 29:
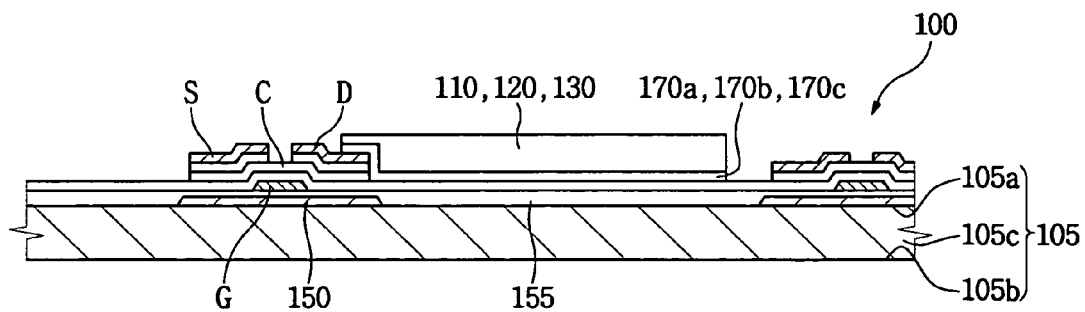
FIG. 29 is a cross-sectional view illustrating a method of manufacturing a substrate for a display apparatus according to a sixteenth exemplary embodiment of the present invention.

FIG. 29 is a cross-sectional view illustrating a method of manufacturing a substrate for a display apparatus according to a sixteenth exemplary embodiment of the present invention.

Referring to FIG. 29, a black matrix pattern 150 is formed on a first surface 105a of a substrate body 105. A chromium thin film, a chromium oxide thin film or a black organic thin film may be patterned by photolithography process to form the black matrix pattern 150 having a lattice shape.

In case that the black matrix pattern 150 includes an electrically conductive material, an insulation layer 155 may be formed on the first surface 105a having the black matrix pattern 150 formed thereon in order to prevent electrical short. In case that the black matrix pattern 150 includes an insulating material, the insulation layer 155 may not be formed.

Then, a thin film transistor TR is formed on the insulation layer 155, and then first, second and third electrodes 170a, 170b and 170c are formed. The thin film transistor TR includes a gate electrode G, a channel layer C, a source electrode S and a drain electrode D. The drain electrode D is electrically connected to the first, second or third electrode 170a, 170b or 170c.

The first, second or third electrodes 170a, 170b or 170c may include an optically transparent and electrically conductive material, for example, such as indium tin oxide (ITO), indium zinc oxide (IZO), etc. The first, second and third electrodes 170a, 170b and 170c may include metal.

Then, first, second or third thin film pattern 110, 120 or 130 is formed on the first, second or third electrodes 170a, 170b or 170c.

Display Apparatus

Embodiment 17

Figure 30:
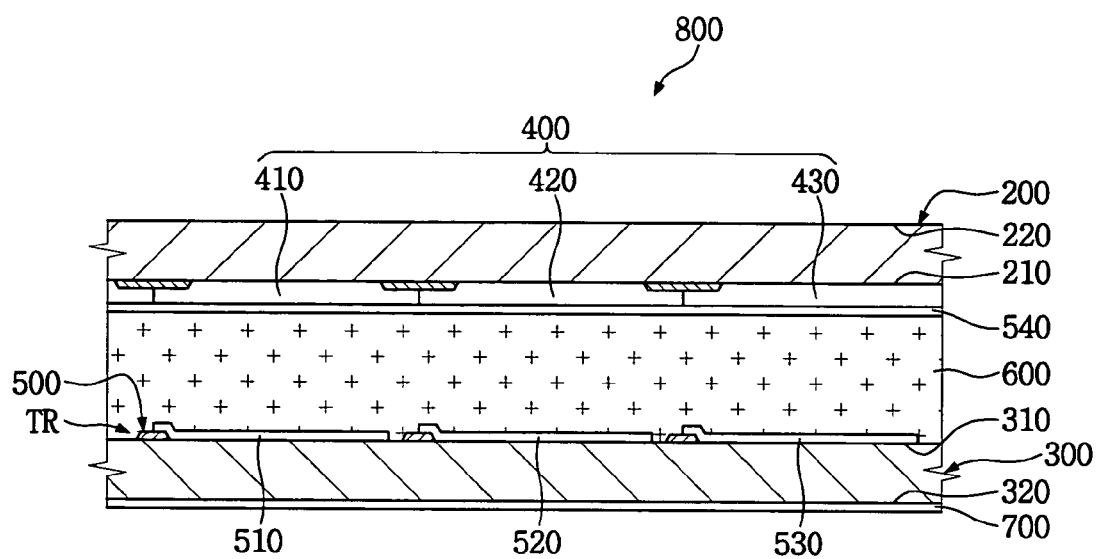
FIG. 30 is a cross-sectional view illustrating a display apparatus according to a seventeenth exemplary embodiment of the present invention.
Figure 31:
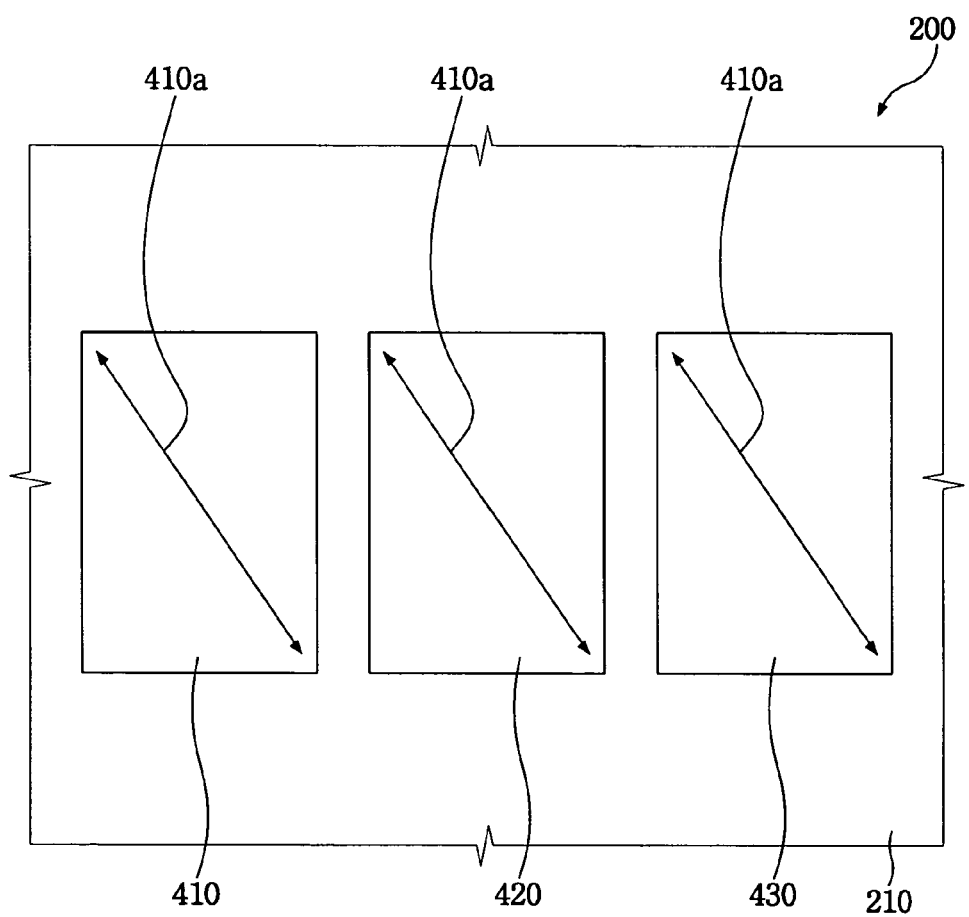
FIG. 31 is a plan view illustrating a first polarization axis of first to third thin film patterns in FIG. 30.

FIG. 30 is a cross-sectional view illustrating a display apparatus according to a seventeenth exemplary embodiment of the present invention, and FIG. 31 is a plan view illustrating a first polarization axis of first to third thin film patterns in FIG. 30.

Referring to FIGS. 30 and 31, a display apparatus 800 includes a first substrate 200, a second substrate 300, a polarization-color filter pattern 400, an electric field generating part 500, a liquid crystal layer 600 and a polarizing plate 700.

The first substrate 200 has a rectangular plate shape. The first substrate 200 includes a first surface 210 and a second surface 220 that is opposite to the first surface 210.

The second substrate 300 has also a rectangular plate shape. The second substrate 300 faces the first substrate 200. The second substrate 300 includes a third surface 310 facing the first surface 210 and a fourth surface 320 that is opposite to the third surface 310.

The polarization-color filter pattern 400 is formed on the first surface 210, and the polarization-color filter pattern 400 includes first, second and third thin film patterns 410, 420 and 430.

The first thin film patterns 410 are arranged in a matrix shape. The first thin film patterns 410 include a first liquid crystal. The first liquid crystal transmits only a first light that has a first wavelength corresponding to a red light. The first thin film patterns 410 also polarize the first light to have a first polarization axis 410a. That is, when a light arrives at the first thin film patterns 410, only a red light having the first polarization axis 410a can pass through the first thin film patterns 410.

The second thin film patterns 420 are arranged in a matrix shape. The second thin film patterns 420 include a second liquid crystal. The second liquid crystal transmits only a second light that has a second wavelength corresponding to a green light. The second thin film patterns 420 also polarize the second light to have a first polarization axis 410a. That is, when a light arrives at the second thin film patterns 420, only a green light having the first polarization axis 410a can pass through the second thin film patterns 420.

The third thin film patterns 430 are arranged in a matrix shape. The third thin film patterns 430 include a third liquid crystal. The third liquid crystal transmits only third light that has a third wavelength corresponding to a blue light. The third thin film patterns 430 also polarize the third light to have a first polarization axis 410a. That is, when a light arrives at the third thin film patterns 430, only a blue light having the first polarization axis 410a can pass through the third thin film patterns 430.

The electric field generating part 500 includes a thin film transistor TR, a first pixel electrode 510, a second pixel electrode 520, a third pixel electrode 530 and a common electrode 540.

For example, the thin film transistors TR are arranged in a matrix shape of the third surface 310 of the second substrate 300.

The thin film transistor TR is formed corresponding to the numbers and positions of the first to third thin film patterns 410, 420 and 430, and the thin film transistor TR is disposed between two thin film patterns of the first, second and third thin film patterns 410, 420 and 430.

The first, second and third pixel electrodes 510, 520 and 530 are electrically connected to a drain electrode of the thin film transistor TR. The first, second and third pixel electrodes 510, 520 and 530 include an optically transparent and electrically conductive material, for example, such as indium tin oxide (ITO), indium zinc oxide (IZO), etc. The first, second and third pixel electrodes 510, 520 and 530 may include metal.

The first, second and third pixel electrodes 510, 520 and 530 face the first, second and third thin film patterns 410, 420 and 430, respectively.

The common electrode 540 is formed on the first, second and third thin film patterns 410, 420 and 430, such that the common electrode 540 covers the first surface 210 of the first substrate 200. The common electrode 540 includes an optically transparent and electrically conductive material, for example, such as indium tin oxide (ITO), indium zinc oxide (IZO), etc.

The liquid crystal layer 600 is interposed between the common electrode 540 and the first to third electrodes 510, 520 and 530. When electric fields are applied to the liquid crystal layer 600, an optical transmittance of a light that passes through the second substrate 300 is changed.

Figure 32:
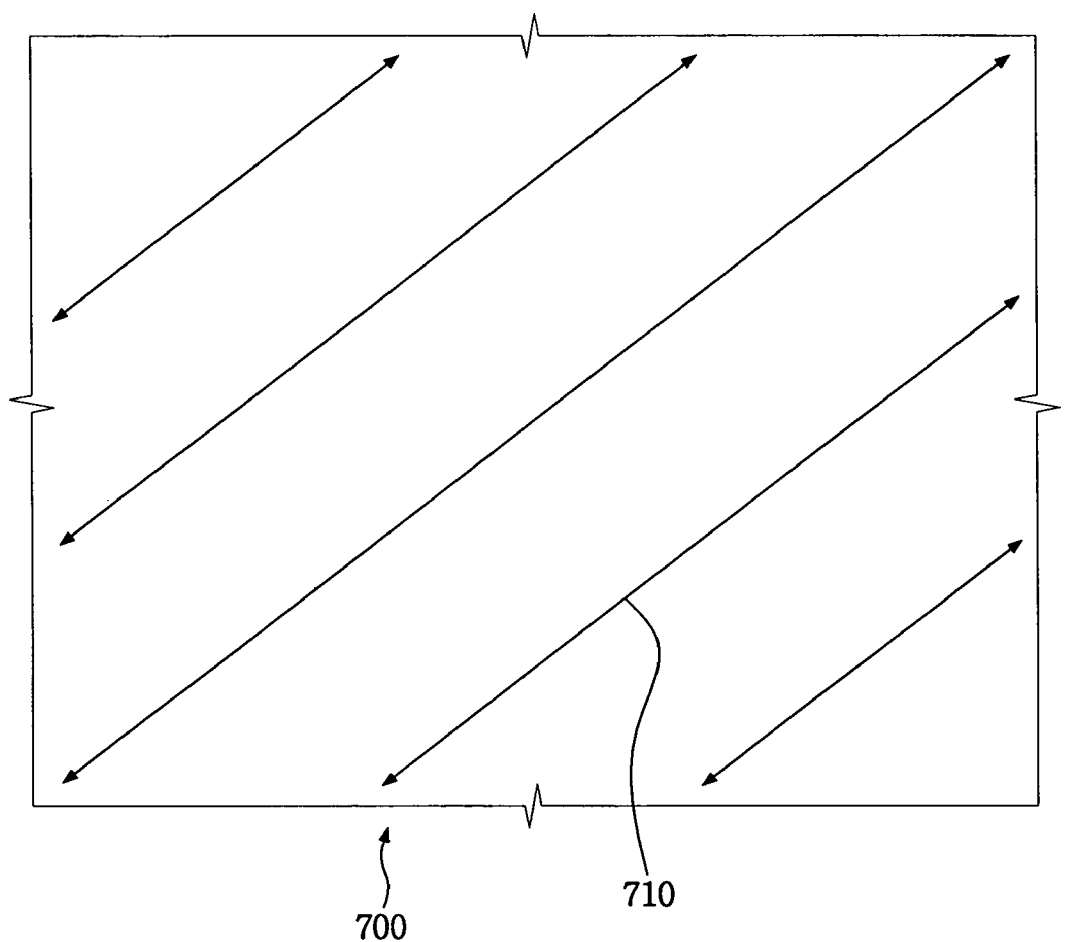
FIG. 32 is a plan view illustrating a polarizing plate in FIG. 30.

FIG. 32 is a plan view illustrating a polarizing plate in FIG. 30.

Referring to FIG. 32, a polarizing plate 700 is disposed on the fourth surface 320 of the second substrate 300. The polarizing plate 700 has a second polarizing axis 710. For example, the second polarizing axis 710 is substantially perpendicular to the first polarizing axis is 410*a* of the first, second and third thin film patterns 410, 420 and 430.

Embodiment 18

Figure 33:
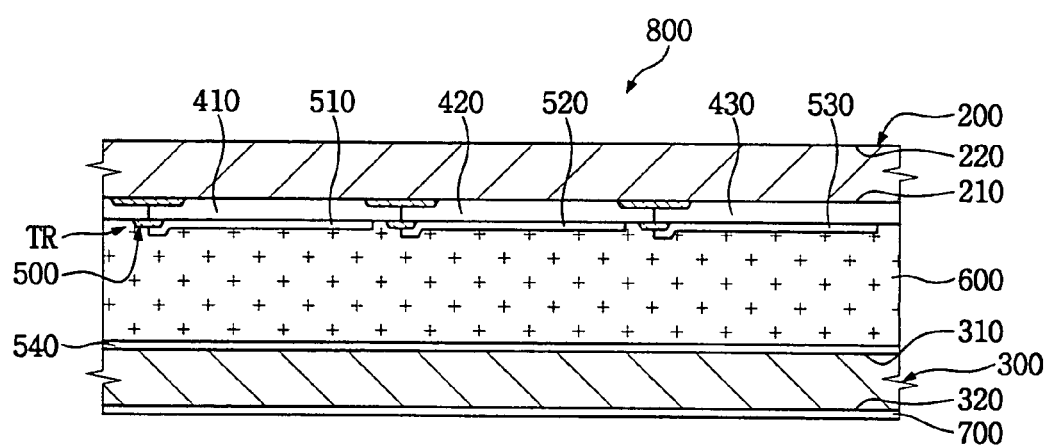
FIG. 33 is a cross-sectional view illustrating a display apparatus according to an eighteenth exemplary embodiment of the present invention.

FIG. 33 is a cross-sectional view illustrating a display apparatus according to an eighteenth exemplary embodiment of the present invention. The display apparatus of the present embodiment is the same as in Embodiment 17 except for an electric field generating part. Thus, the same reference numerals will be used to refer to the same or similar parts as those described in Embodiment 17 and any further explanation will be omitted.

Referring to FIG. 33, an electric field generating part 500 includes a thin film transistor TR, first to third pixel electrodes 510, 520 and 530, and a common electrode 540.

The thin film transistors TR are arranged in a matrix shape on a first surface 210 of a first substrate 200.

The thin film transistor TR is formed on a boundary region between two thin film patterns of the first to third thin film patterns 410, 420 and 430.

The first, second or third pixel electrode 510, 520 or 530 is electrically connected to a drain electrode of the thin film transistor TR, and the first, second and the third pixel electrodes 510, 520 and 530 are formed on the first, second and third thin film patterns 410, 420 and 430, respectively.

The common electrode 540 is formed on a third surface 310 of a second substrate 300. The common electrode 540 covers the entire third surface 310. The common electrode 540 includes an optically transparent and electrically conductive material, for example, such as indium tin oxide (ITO), indium zinc oxide (IZO), etc.

According to the present invention, the number of the parts of a substrate for a display apparatus may be reduced, so that a process of manufacturing the substrate may be simplified.

Having described the exemplary embodiments of the present invention and its advantages, it is noted that various changes, substitutions and alterations can be made herein without departing from the spirit and scope of the invention as defined by appended claims.

What is claimed is:

1. A substrate comprising:
a substrate body having a first surface and a second surface that is opposite to the first surface;
a first thin film pattern formed on the first surface of the substrate body, the first thin film pattern including a first liquid crystal of which first liquid crystal molecules are arranged in a first direction in order to transmit only a first light having a first wavelength and a specific polarizing axis;
a second thin film pattern formed on the first surface of the substrate body, the second thin film pattern including a second liquid crystal of which second liquid crystal molecules are arranged in the first direction in order to transmit only a second light having a second wavelength and the specific polarizing axis; and
a third thin film pattern formed on the first surface of the substrate body, the third thin film pattern including a third liquid crystal of which third liquid crystal molecules are arranged in the first direction in order to transmit only a third light having a third wavelength and the specific polarizing axis.

2. The substrate of claim 1, wherein the first wavelength corresponds to a red color, the second wavelength corresponds to a green color and the third wavelength corresponds to a blue color.

3. The substrate of claim 1, wherein the first, second and third thin film patterns form a unit, and a plurality of the units is arranged in a matrix shape on the first surface of the substrate body.

4. The substrate of claim 3, further comprising a black matrix pattern formed on the first surface of the substrate, the black matrix pattern covering a region between two thin film patterns of the first, second and third thin film patterns.

5. The substrate of claim 3, further comprising a black matrix pattern formed on the second surface of the substrate, the black matrix pattern covering a region between two thin film patterns of the first, second and third thin film patterns.

6. The substrate of claim 5, further comprising a leveling layer formed on the second surface to cover the black matrix pattern.

7. The substrate of claim 6, further comprising a common electrode formed on the leveling layer.

8. The substrate of claim 5, wherein the black matrix pattern includes chromium, chromium oxide or organic material.

9. The substrate of claim 1, further comprising a leveling layer formed on the first surface such that the leveling layer absorbs light, and a transparent electrode formed on the leveling layer and the first, second and third thin film patterns.

10. The substrate of claim 1, further comprising a transparent electrode formed on the first surface such that the transparent electrode covers the first, second and third thin film patterns, and a black matrix pattern formed on the second surface such that the black matrix pattern is disposed in a region between two thin film patterns of the first, second and third thin film patterns.

11. The substrate of claim 1, further comprising a black matrix pattern formed on the second surface such that the black matrix pattern covers a region between two thin film patterns of the first, second and third thin film patterns, and a transparent electrode formed on the second surface such that the transparent electrode covers the black matrix pattern.

12. The substrate of claim 1, further comprising first, second and third electrodes corresponding to the first, second and third thin film patterns, respectively, and the first, second and third electrodes being electrically connected to a thin film transistor.

13. The substrate of claim 12, further comprising a black matrix pattern formed on the first surface such that the black matrix pattern has a lattice type between two thin film patterns of the first, second and third thin film patterns, and a transparent insulation layer formed on the black matrix pattern.

14. The substrate of claim 12, wherein the first, second and third electrodes comprises an optically transparent and electrically conductive material.

15. The substrate of claim 12, wherein the first, second and third electrodes comprises metal.

16. The substrate of claim 12, wherein the first, second and third thin film pattern are formed on the first, second and third electrodes, respectively.

17. A method of manufacturing a substrate, comprising:
forming a first thin film pattern on a first surface of a substrate body, the first thin film pattern including a first liquid crystal of which first liquid crystal molecules are arranged in a first direction in order to transmit only a first light having a first wavelength and a specific polarizing axis;
forming a second thin film pattern on the first surface of the substrate body, the second thin film pattern including a second liquid crystal of which second liquid crystal molecules are arranged in the first direction in order to transmit only a second light having a second wavelength and the specific polarizing axis; and forming a third thin film pattern on the first surface of the substrate body, the third thin film pattern including a third liquid crystal of which third liquid crystal molecules are arranged in the first direction in order to transmit only a third light having a third wavelength and the specific polarizing axis.

18. The method of claim 17, further comprising forming a black matrix pattern that covers a region between two thin film patterns of the first, second and third thin film patterns, and wherein the first, second and third thin film patterns form a unit, and a plurality of the units is arranged in a matrix shape on the first surface of the substrate body.

19. The method of claim 17, further comprising:
forming a leveling layer covering the first, second and third thin film patterns; and
forming a transparent electrode on the leveling layer.

20. The method of claim 17, further comprising forming a black matrix pattern on a second surface that is opposite to the first surface, the black matrix pattern covering a region between two thin film patterns of the first, second and third thin film patterns, and wherein the first, second and third thin film patterns form a unit, and a plurality of the units is arranged in a matrix shape on the first surface of the substrate body.

21. The method of claim 17, further comprising forming a transparent electrode on a second surface that is opposite to the first surface.

22. The method of claim 17, wherein the first, second and third thin film patterns are formed by:
aligning a first mask having a first opening corresponding to the first thin film pattern;
applying the first liquid crystal to the substrate through the first opening to form the first thin film pattern;
aligning a second mask having a second opening corresponding to the second thin film pattern;
applying the second liquid crystal to the substrate through the second opening to form the second thin film pattern;
aligning a third mask having a third opening corresponding to the third thin film pattern; and
applying the third liquid crystal to the substrate through the third opening to form the third thin film pattern.

23. The method of claim 17, wherein the first, second and third thin film patterns are formed by:
patterning a first thin film including the first liquid crystal to form the first thin film pattern;
patterning a second thin film including the second liquid crystal to form the second thin film pattern;
patterning a third thin film including the third liquid crystal to form the third thin film pattern; and
arranging the liquid crystal molecules of the first, second and third liquid crystal to have a specific direction of polarization axis.

24. The method of claim 17, wherein the first, second and third thin film patterns are formed by:
forming the first, second and third thin film patterns including the first, second and third liquid crystals, respectively, on a surface of a roller; and
transcribing the first, second and third thin film patterns to the first surface of the substrate body.

25. The method of claim 17, wherein the first surface includes thin film transistors formed thereon, and further comprising forming first, second and third electrodes that are electrically connected to the thin film transistors, respectively.

26. The method of claim 25, further comprising forming a black matrix pattern that is disposed in a region between two thin film patterns of the first, second and third thin film patterns.

27. The method of claim 25, wherein the first, second and third pixel electrodes are formed on the first, second and third thin film patterns, respectively.

28. A display apparatus comprises:
a first substrate including a first surface and a second surface that is opposite to the first surface;
a second substrate including a third surface facing the first surface, and a fourth surface that is opposite to the third surface;
a polarization-color filter pattern including i) a first thin film pattern formed on the first surface of the first substrate, the first thin film pattern including first liquid crystal of which first liquid crystal molecules are arranged in a first direction in order to transmit only a first light having a first wavelength and a first polarizing axis, ii) a second thin film pattern formed on the first surface of the first substrate, the second thin film pattern including a second liquid crystal of which second liquid crystal molecules are arranged in the first direction in order to transmit only a second light having a second wavelength and the first polarizing axis, and iii) a third thin film pattern formed on the first surface of the first substrate, the third thin film pattern including a third liquid crystal of which third liquid crystal molecules are arranged in the first direction in order to transmit only a third light having a second wavelength and the first polarizing axis;
an electric field generating part disposed between the first and second substrates, the electric field generating part generating electric fields between the first and second substrates;
a liquid crystal layer disposed between the first and second substrates, an arrangement of liquid crystal molecules of the liquid crystal layer being changed by the electric fields to adjust an optical transmittance; and
a polarizing plate disposed on the second substrate, the polarizing plate having a second polarizing axis.

29. The display apparatus of claim 28, wherein the electric field generating part comprises:
first, second and third pixel electrodes corresponding to the first, second and third thin film patterns, the first, second and third pixel electrodes being disposed on the third surface;
a plurality of thin film transistors formed on the third surface such that each of the thin film transistors is electrically connected to one of the first, second and third pixel electrodes; and
a common electrode disposed on the first surface.

30. The display apparatus of claim 28, wherein the electric field generating part comprises:
first, second and third pixel electrodes disposed on the first, second and third thin film patterns, respectively;
a plurality of thin film transistors formed on the third surface such that each of the thin film transistors is electrically connected to one of the first, second and third pixel electrodes; and
a common electrode disposed on the third surface.

31. The display apparatus of claim 28, wherein the polarizing plate is attached to the fourth surface.

32. The display apparatus of claim 28, wherein the first polarizing axis is substantially perpendicular to the second polarizing axis.

* * * * *